3,741,954
MONOAZO AND DISAZO COMPOUNDS HAVING A NITROANILINOSULFONYLOXYPHENYL GROUP
Ruedi Altermatt, Tecknau, Basel-Land, Switzerland, assignor to Sandoz Ltd., Basel, Switzerland
No Drawing. Filed Sept. 23, 1970, Ser. No. 74,924
Claims priority, application Switzerland, Oct. 21, 1969, 15,709/69
Int. Cl. C09b 29/34
U.S. Cl. 260—205           15 Claims

ABSTRACT OF THE DISCLOSURE

Compounds of the formula $(E-N=N)_m$—[A]—NH—[B]—$SO_2$—O—[D]—$(N=N-E)_n$
                              |
                             $NO_2$ and substituted derivatives thereof, wherein each E is independently aryl or acylacetyl, e.g., phenyl, naphthyl, thiazolyl, benzothiazolyl, thiadiazolyl, imidazolyl, pyrazolyl and acyl

—CH—CO—NH—$C_6H_5$
  | and substituted derivatives thereof, $m$ is 0 or 1, and
$n$ is 0 or 1, with the proviso that the sum of $m$ and $n$ is 1 or 2.

These dyes are highly suitable for dyeing and printing fibres, yarns and textiles consisting of synthetic or regenerated organic materials of high molecular weight and hydrophobic character.

---

The new compounds are of the formula $(E-N=N)_m$—[A]—NH—[B]—$SO_2$—O—[D]—$(N=N-E)_n$
                              |
                             $NO_2$
(I)

where each of the two E symbols, independently of each other, stands for a radical of aromatic character or an acylacetic acid radical which may be substituted, $m$ for 0 or 1 and $n$ for 0 or 1, where the sum of $m$ and $n$ is at least 1, and where the rings A, B and D may bear further substituents and their molecule is free from sulphonic acid groups.

The preferred radicals E are, for example, phenyl, naphthyl, thiazolyl, benzothiazolyl, thiadiazolyl, imidazolyl and pyrazolyl radicals, or radicals of formula acyl-CH—CO—NH—$C_6H_5$
      |

The rings of aromatic character may be substituted by, for example, halogen-atoms, notably chlorine or bromine atoms, alkyl, alkoxy, cyano, thiocyano, nitro, trifluoromethyl, acyl, acyloxy, hydroxy or acylamino groups, or by monoalkylamino or dialkylamino groups which may be further substituted.

The rings A, B and D also may bear the aforenamed substituents. All the alkyl and alkoxy groups contain preferably 1, 2, 3 or 4 carbon atoms and may bear further substituents, such as chlorine or bromine atoms, phenyl, alkoxy, cyano, acyl or acyloxy groups.

The preferred acyl groups correspond to one of the formulae

R—X— or R'—Y— where R stands for a hydrocarbon which may bear hetero atoms and/or the aforementioned substituents, preferably a substituted or unsubstituted alkyl or phenyl group, X for radical of the formula —O—CO— or —$SO_2$—,
R' for a hydrogen atom or for one of the meanings of R,
Y for a radical of the formula —CO—, —NR''—CO— or —NR''—$SO_2$— and
R'' for a hydrogen atom or R.

Preferably each of the two E symbols represents, independently of each other, a phenyl radical which may be substituted by chlorine, or bromine atoms, lower alkyl, lower alkoxy, phenoxy, trifluoromethyl, thiocyano, cyano, nitro, hydroxyl, formyl, lower alkylcarbonyl (alkanoyl), benzoyl, lower alkylsulphonyl, lower hydroxyalkylsulphonyl, benzylsulfonyl, aminosulfonyl (sulfamoyl), lower alkylaminosulfonyl (alkylsulfamoyl), lower cyanoalkylaminosulfonyl (cyanoalkylsulfamoyl), lower hydroxyalkylaminosulfonyl (hydroxyalkylsulfamoyl), phenylaminosulfonyl (phenylsulfamoyl), lower alkylamino, cyanoethylamino, formylamino (formamido), lower alkylcarbonylamino, alkanamido), chloroacetylamino (chloroacetamido), chloropropionylamino (chloropropionamido), lower alkylsulfonylamino, lower alkoxycarbonyl, benzyloxycarbonyl, lower alkoxycarbonylamino, aminocarbonyl carbamoyl, lower alkylaminocarbonyl alkylcarbamoyl or phenylaminocarbonyl phenylcarbamoxyl groups; a naphthalene radical which may be substituted by a lower alkyl sulphonyl group; a benzothiazole radical which may be substituted by chlorine or bromine atoms, a nitro, cyano, lower alkylsulphonyl, lower alkoxy, trifluoromethyl, aminosulphonyl, lower alkylaminosulphonyl, lower hydroxyalkylaminosulphonyl or lower alkoxyalkylaminosulphonyl group; a thiazole radical which may be substituted by chlorine or bromine atoms, lower alkyl, lower alkoxy, nitro, cyano, lower alkylsulphonyl or trifluoromethyl groups; a pyrazole radical which may be substituted by lower alkyl, hydroxyl, amino, carboxylic acid amide, benzyl or phenyl groups; a 3-phenylthiadiazolyl-(1,2,4); or a thiophene; quinoline; hydroxyquinoline; tetrazole or acetoacetic acid anilide radical.

The ring A may bear as substituents chlorine or bromine atoms, lower alkyl, lower alkoxy, formylamino, lower alkanylamino, benzoylamino benzamido, lower alkoxycarbonylamino, benzyloxycarbonylamino or chloropropionylamino groups, the ring B a further nitro group and the ring D chlorine or bromine atoms, lower alkyl, phenyl, lower alkoxy, phenoxy, cyano, nitro, thiocyano, lower alkoxycarbonyl, formylamino, lower alkanoylamino, benzoylamino, lower alkylsulphonyl, benzylsulphonyl, phenylsulphonyl, aminosulphonyl, lower alkylcarbonyl, benzoyl or aminocarbonyl groups.

In the especially preferred compounds of Formula I the sum of *m* and *n* is 1.

The alkyl, alkylene and alkoxy radicals which are said to be "lower" each contain not more than 4 and preferably 1 or 2 carbon atoms. Alkylamino denotes monoalkylamino and dialkylamino.

The new compounds are produced by the condensation of one mole of a compound of formula

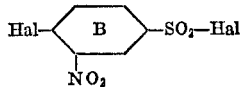

(II)

where Hal represents a chlorine or bromine atom, with one mole of a phenol of formula

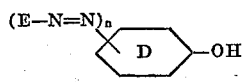

(III)

and subsequently with one mole of an amine of formula

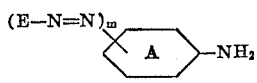

(IV)

The condensation reaction generally takes place in an inert solvent, such as water, ethanol, n-butanol, benzyl alcohol, ethylene glycol, polyethylene glycol, benzene, toluene, xylene or chlorobenzene at temperatures in the range of 25° C. to 200° C. It is usually of advantage to add to the reaction mixture an agent which binds acid, such as an alkali carbonate, bicarbonate or acetate, magnesium or calcium oxide.

The halogen atom bound to the $SO_2$ group in the compound of Formula II is more highly reactive than the halogen atom bound to the nucleus; accordingly the initially added phenol of Formula III is bound to the $SO_2$ group and the amine of Formula IV directly to the nucleus B. It is of advantage to carry out the first step of the reaction at temperatures below 100° C. and the second step at about 80° C. to 200° C., if necessary in an autoclave.

The compounds of Formula I can also be obtained by condensing one mole of a sulphonic acid of the formula

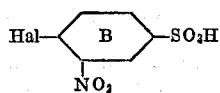

(VI)

where Hal represents a chlorine or bromine atom, with one mole of an amine of Formula IV, converting the resulting compound into the sulphonic acid chloride of the formula

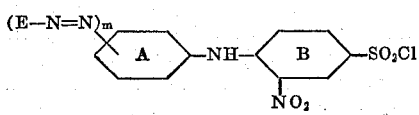

(VII)

and condensing this with one mole of a phenol of Formula III.

The condensation of the compound of Formula VI with the amine of Formula IV, preferably in one of the aforenamed solvents, is carried out at temperatures in the range of about 80° C. to 200° C., while the condensation of the compound of Formula VII with the phenol of Formula III is effected preferably in the same reaction medium at temperatures of 25° C. to 130° C.

The compound of Formula I can be produced by another route comprising diazotization or tetrazotization of a compound of the formulae

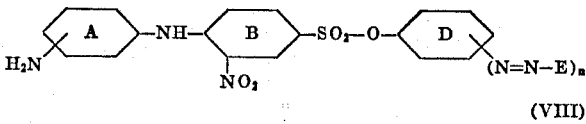

(VIII)

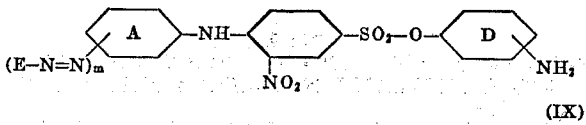

(IX)

or

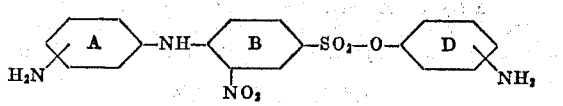

(X)

and coupling of the resulting compound with a compound of the formula $$E\text{—}H \qquad (XI)$$

The diazotizing and coupling reactions have been known for more than a hundred years (F. Griess, Liebigs Ann. Chem. 137, 30, 1866) and are the most frequently performed reactions in the chemistry of dyes, so there is no necessity to describe them in greater detail.

Excellent properties as dyes are shown by mixtures of compounds of Formula I. These mixtures can be produced by reacting one mole of a compound of the formula

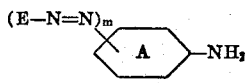

with one mole of a mixture of different compounds of the formula

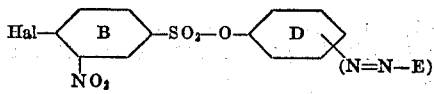

or by reacting one mole of a mixture of different compounds of the formula

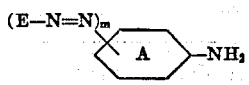

with one mole of a compound of the formula

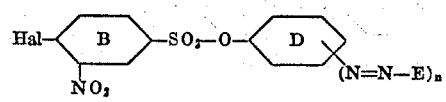

It is advantageous to convert the new dyes, produced as given in the foregoing, into dyeing preparations before application to the fibre. For this purpose standard methods are used, such as grinding in the presence of dispersing agents and/or fillers. The mixtures are dried in a vacuum or spray drier to give dry preparations. After the addition of a suitable volume of water, they can be exhaust dyed, pad dyed or printed from long or short bath as required.

From aqueous dispersions the dyes build up powerfully on fibres, yarns and textiles consisting of synthetic or regenerated organic materials of high molecular weight and hydrophobic character. They are especially suitable for dyeing and printing polyester, cellulose diacetate, cellulose triacetate and polyamide fibres and textiles of these fibres. They are also applicable to polyolefin fibres.

The known dyeing and printing methods are used, for example the process described in French Pat. 1,445,371.

The dyeings obtained are of yellow shade and show high fastness to thermofixation, pleating and sublimation, gas fumes, cross dyeing, dry cleaning, ozone, chlorine, and to wet treatments, such as water, washing and perspiration. They are stable to the pre-cure and post-cure permanent press finishing processes, are well dischargeable and show a good reverse of wool, rayon, silk and cotton. The light fastness is excellent, even in pale shades, which makes the dyes highly suitable as components for the production of fashionable pastel shades. In green combination shades with blue dyes, they are free from catalytic fading. The dyes are stable at temperatures up to 200° C. and are resistant to prolonged boiling, reduction and hydrolysis, especially in the range of 80° C. to 140° C. This stability is not adversely affected by the liquor ratio or the hydrogen concentration in the pH region of 5 to 9, or by the presence of dyeing accelerants.

In the following examples the parts and percentages are by weight and the temperatures in degrees centigrade.

EXAMPLE 1

A mixture of 31.4 parts of 1-chloro-2-nitrobenzene-4-sulphonic acid phenylester, 19.7 parts of 4-amino-1,1'-azobenzene, 80 parts of polyethylene glycol and 15 parts of anhydrous sodium acetate is raised to 160° in 30 minutes with thorough stirring. It is stirred for 15–20 hours at 160–170° and then allowed to cool to about 70°, at which temperature it is diluted with 100 parts of ethanol. Subsequently 50 parts of water are slowly added. The dye settles out and after 2 hours it is filtered off, washed with a little cold ethanol and then with hot water and dried. The pure dye of the formula

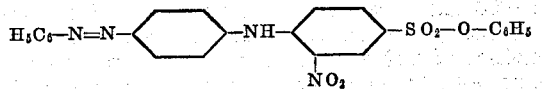

thus formed gives dyeings of reddish yellow shade on synthetic fibres which have excellent fastness properties.

EXAMPLE 2

A mixture of 32.8 parts of 1-chloro-2-nitrobenzene-4-sulphonic acid-(3'-methyl)-phenylester, 15 parts of anhydrous sodium acetate and 19.7 parts of 4-amino-1,1'-azobenzene is raised to 160° in 30 minutes, on which a melt is formed. This is stirred for 15 hours at 160–165° and then allowed to cool. At 130° 20 parts of ethylene glycol are added and cooling is continued. At 90° 40 parts of ethanol are added and after a few minutes 10 parts of hot water. The mixture is stirred vigorously for 1 hour and afterwards the dye, which has settled out, is filtered, washed with a little cold ethanol and then with ample water and dried.

The dye thus formed has the formula

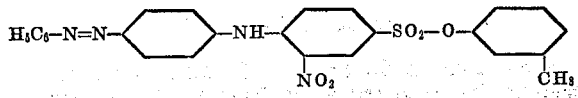

It dyes synthetic fibres in reddish yellow shades with excellent fastness properties.

EXAMPLE 3

39.9 parts of the compound of the formula

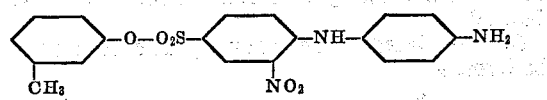

and 6 parts of sodium hydroxide are dissolved in 600 parts of water and the solution is mixed with a solution of 7 parts of sodium nitrite in 20 parts of water. The resulting solution is dropped into a mixture of 50 parts of water, 100 parts of ice and 35 parts of 35% hydrochloric acid. Stirring is continued for 3 hours at 0–5°, then the excess sodium nitrite is decomposed with 0.5 part of aminosulphonic acid. The diazonium salt solution thus formed is dropped slowly at 0°–5° into a solution of 1-phenyl-3-methyl-5-pyrazolone, 6 parts of sodium hydroxide and 8 parts of sodium carbonate in 100 parts of water and 50 parts of ice. The coupling mixture is stirred for 3–4 hours at 0°–5°, after which time the newly formed dye is filtered, washed with water and dried. The pure dye of the formula

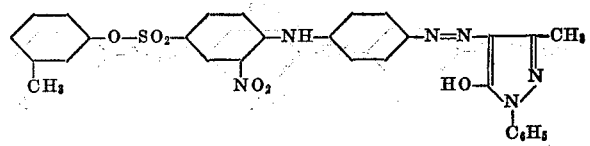

gives yellow dyeings on syntheic fibres which have excellent fastness properties.

EXAMPLE 4

A mixture of 44.6 parts of the compound of the formula

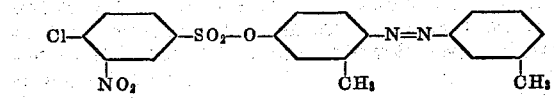

9.3 parts of aniline, 200 parts of ethylene glycol and 10 parts of anhydrous sodium acetate is raised to 145° in 40 minutes, stirred for 2 hours at 145–150° and then allowed to cool to 20–30° C. The dye settles out and is filtered, washed with some ethanol and then with ample hot water and dried. The dye thus obtained, which has the formula

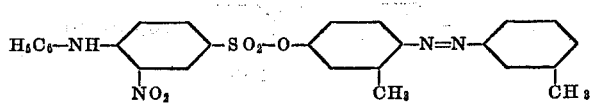

dyes synthetic fibres in yellow shades with excellent fastness properties.

EXAMPLE 5

256 parts of 1-chloro-2-nitrobenzene-4-sulphonic acid chloride are added at 40–50° in small portions with vigorous stirring to a solution of 129 parts of 4-chloro-1-hydroxybenzene and 44 parts of sodium hydroxide in 500 parts of water. The reaction mixture is stirred for 3 hours at 50–55° and then allowed to cool to 20°, on which the product settles out. It is filtered, washed with cold water and recrystallized from ethanol.

34.8 parts of the compound are added with stirring to 19.7 parts of 4-amino-1,1'-azobenzene and 15 parts of anhydrous sodium acetate. The mixture is stirred further and heated to 160° in 15 minutes to form a melt. The melt is stirred at 160–165° and then allowed to cool to 130°, at which temperature 25 parts of ethylene glycol are added. Cooling is continued to 85°, when 50 parts of ethanol are added and after a few minutes 15 parts of hot water. The mixture is then vigorously stirred for 1 hour. The dye settles out and is filtered, washed with a little cold ethanol and then with ample hot water and dried. The dye thus produced has the formula

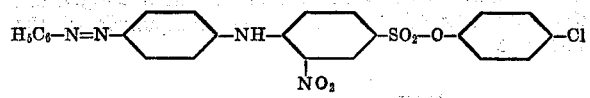

and gives dyeings of reddish yellow shade on synthetic fibres which have excellent fastness properties.

EXAMPLE 6

A mixture of 37.3 parts of 1-chloro-2,6-dinitrobenzene-4-sulphonic acid-(3'-methyl)-phenylester, 19.7 parts of 4-amino-1,1'-azobenzene, 15 parts of anhydrous sodium acetate and 200 parts of ethylene glycol is raised to 140°, stirred for 3-4 hours at 140-150° and then allowed to cool to 20-30°.

The dye settles out in crystalline form and is filtered, washed with some cold ethanol and then with hot water and dried. This dye has the formula

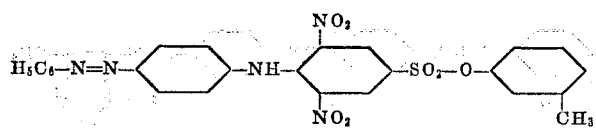

and gives dyeings of reddish yellow shade on synthetic fibres which have outstandingly good fastness properties.

EXAMPLE 7

A mixture of 31.4 parts of 1-chloro-2-nitrobenzene-4-sulphonic acid phenylester, 32.8 parts of 1-chloro-2-nitrobenzene-4-sulphonic acid-(3'-methyl)-phenylester, 39.4 parts of 4-amino-1,1'-azobenzene and 30 parts of anhydrous sodium acetate is raised to 150° in 30 minutes and the resulting melt is stirred at this temperature for 8-12 hours. It is then allowed to cool to 130°, at which temperature 40 parts of ethylene glycol are added. Cooling is continued to 80°, when 80 parts of ethanol are added, followed after 30 minutes by 40 parts of hot water. The mixture is thoroughly stirred for a further hour at 80°. The product settles out and is filtered, washed with a little cold ethanol and then with ample hot water and dried. The heterogeneous dye formed consists of two compounds having the formulae

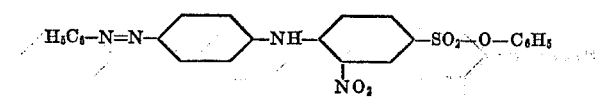

and

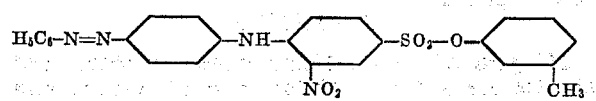

It dyes polyester fibres in reddish yellow shades which have excellent all-round fastness.

EXAMPLE 8

A mixture of 65.5 parts of 1-chloro-2-nitrobenzene-4-sulphonic acid-(3'-methyl)-phenylester, 19.7 parts of 4-amino-1,1'-azobenzene, 21.1 parts of 4-amino-3'-methyl-1,1'-azobenzene and 30 parts of anhydrous sodium acetate is raised in 30 minutes to 170-180°. The melt thus formed is stirred for 12 hours at this temperature and then allowed to cool. At 130°, 40 parts of ethylene glycol are added. Cooling is continued to 80°, at which temperature 100 parts of ethanol are added, folollwed after 30 minutes by 50 parts of hot water. The mixture is then stirred well for a further hour at 80°, on which the product settles out. It is filtered, washed with some cold ethanol and then with ample hot water and dried. The heterogeneous dye thus formed consists of two compounds of the formulae

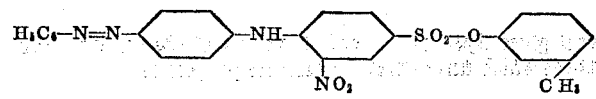

and

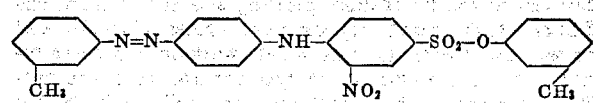

It dyes synthetic fibres in reddish yellow shades with excellent fastness properties.

EXAMPLE 9

A mixture of 35.9 parts of 1-chloro-2,6-dinitrobenzene-4-sulphonic acid phenylester, 19.7 parts of 4-amino-1,1'-azobenzene, 15 parts of anhydrous sodium acetate and 200 parts of ethylene glycol is heated to 140°, stirred for 3-4 hours at 140-150° and then allowed to cool to 20-30°. The dye settle out as crystals which are filtered, washed with a little cold ethanol and then with hot water and dried. The dye thus formed has the formula

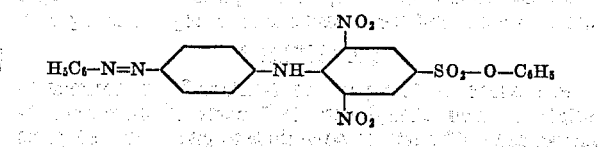

and gives reddish yellow dyeings of excellent fastness on synthetic fibres.

Application Example 1

A mixture of 7 parts of the dye produced as in Example 1, 4 parts of sodium dinaphthylmethanedisulphonate, 4 parts of sodium cetylsulphate and 5 parts of sodium sulphate is ground in a ball mill for 48 hours to give a fine powder. Two parts of the powder are dispersed in a bath of 3000 parts of water set with 3 parts of a 30% solution of a highly sulphonated castor oil and 20 parts of an emulsion of a chlorinated benzene. 100 parts of a fabric of polyester fibre are entered into this dyebath at 20-25°. The temperature is increased to 95-100° in about 30 minutes and the fabric dyed for 1 hour at this temperature. It is then removed, rinsed, soaped for 15 minutes at 70° with a 0.1% solution of an alkylphenylpolyglycolether, rinsed again and dried. A reddish yellow dyeing, having excellent fastness properties, is obtained.

Application Example 2

A mixture of 30 parts of the dye produced as in Example 2, 40 parts of sodium dinaphthylmethanedisulphonate, 50 parts of sodium cetylsulphate and 50 parts of anhydrous sodium sulphate is ground in a ball mill for 48 hours to give a fine powder. 4 parts of the powder are dispersed in 1000 parts of water at 40-50°. 100 parts of a scoured fabric of polyester fibre are entered into the bath and, after slow heating to 130°, the fabric is dyed for about 1 hour at this temperature under pressure. On removal it is rinsed, soaped, rinsed and dried. A reddish yellow dyeing with excellent fastness properties is obtained.

Application Example 3

A fine aqueous dispersion of 30 parts of the heterogeneous dye produced as in Example 7, 70 parts of sodium dinaphthylmethanedisulphonate and 3 parts of sodium alginate is made up to 1000 parts with water and stirred well. A polyester fabric is padded with this liquor at 20°, air dried at 60-100° and treated for 1 minute in dry heat at 230° for fixation of the dyeing. The fabric is then rinsed, soaped, rinsed again and dried. A level reddish yellow dyeing with good fastness properties is obtained.

The dyes listed in the following table correspond to the formula

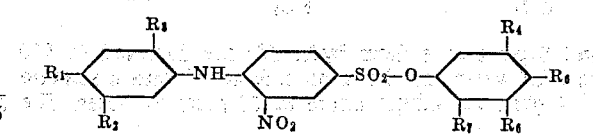

TABLE

| Ex. No. | R₁ | R₂ | R₃ | R₄ | R₅ | R₆ | R₇ | Shade on polyester fibre |
|---|---|---|---|---|---|---|---|---|
| 10 | H₅C₆—N=N— | H | H | H | H | H | H | Reddish yellow |
| 11 | H₅C₆—N=N— | H | H | H | —CH₃ | H | —CH₃ | Do. |
| 12 | H₅C₆—N=N— | H | H | —CH₃ | H | —CH₃ | H | Do. |
| 13 | H₅C₆—N=N— | H | H | H | —Cl | H | —Cl | Do. |
| 14 | H₅C₆—N=N— | H | H | H | —Cl | H | H | Do. |
| 15 | H₅C₆—N=N— | H | H | H | —COOCH₃ | H | H | Do. |
| 16 | H₅C₆—N=N— | H | H | H | —COOC₃H₇ | H | H | Do. |
| 17 | H₅C₆—N=N— | H | H | H | —CH₃ | H | —NHCOCH₃ | Do. |
| 18 | H₅C₆—N=N— | H | H | H | —Cl | H | —NHCOCH₃ | Do. |
| 19 | H₅C₆—N=N— | H | H | H | —Cl | H | —NHCOCH₃ | Do. |
| 20 | H₅C₆—N=N— | H | H | H | H | H | —NHCOCH₃ | Do. |
| 21 | H₅C₆—N=N— | H | H | H | H | H | —NHCOCH₃ | Do. |
| 22 | H₅C₆—N=N— | H | H | H | —COOCH₂CH₃ | H | H | Do. |
| 23 | (4-NO₂-C₆H₄)—N=N— | H | H | —CH₃ | H | H | H | Do. |
| 24 | (4-CH₃-C₆H₄)—N=N— | H | H | —CH₃ | H | H | H | Do. |
| 25 | (3-CH₃-C₆H₄)—N=N— | —CH₃ | H | —CH₃ | H | H | H | Do. |
| 26 | (4-CN-C₆H₄)—N=N— | H | —OCH₃ | —CH₃ | H | H | H | Do. |
| 27 | (4-Br-C₆H₄)—N=N— | H | H | —CH₃ | H | H | H | Do. |
| 28 | (4-CH₃CO-C₆H₄)—N=N— | H | H | —CH₃ | H | H | H | Do. |
| 29 | (4-CH₃O₂S-C₆H₄)—N=N— | H | —CH₃ | —CH₃ | H | H | H | Do. |
| 30 | (4-N=C=S-C₆H₄)—N=N— | —CH₃ | —CH₃ | —CH₃ | H | H | H | Do. |
| 31 | (4-CH₃OCO-C₆H₄)—N=N— | H | H | —CH₃ | H | H | H | Do. |
| 32 | (4-CH₃COO-C₆H₄)—N=N— | H | H | —CH₃ | H | H | H | Do. |
| 33 | (4-(CH₃)₂NCO-C₆H₄)—N=N— | H | H | —CH₃ | H | H | H | Do. |
| | | | | —CH₃ | | H | H | Do. |
| 34 | (4-(CH₃)₂NSO₂-C₆H₄)—N=N— | H | H | —CH₃ | H | H | H | Do. |

TABLE—Continued

| Ex. No. | $R_1$ | $R_2$ | $R_3$ | $R_4$ | $R_5$ | $R_6$ | $R_7$ | Shade on polyester fibre |
|---|---|---|---|---|---|---|---|---|
| 35 | $CH_3HN-SO_2-\bigcirc-N=N-$ | H | H | $-CH_3$ | H | H | H | Do. |
| 36 | $H_2N-SO_2-\bigcirc-N=N-$ | H | H | $-CH_3$ | H | H | H | Do. |
| 37 | $H_3C-NHO_2S-\bigcirc-N=N-$ | H | H | $-CH_3$ | H | H | H | Do. |
| 38 | $CH_3O_2S-\bigcirc\bigcirc-N=N-$ | $-CH_3$ | H | $-CH_3$ | H | H | H | Do. |
| 39 | benzothiazolyl-$N=N-$ | H | H | $-CH_3$ | H | H | H | Do. |
| 40 | pyrazolyl(CH$_3$)-$N=N-$ | H | H | $-CH_3$ | H | H | H | Do. |
| 41 | pyrazolyl(C$_6$H$_5$, CONH$_2$)-$N=N-$ | $-CH_3$ | H | $-CH_3$ | H | H | H | Do. |
| 42 | $H_3C-$pyrazolyl-$N=N-$ | $-CH_3$ | H | $-CH_3$ | H | H | H | Do. |
| 43 | thiazolyl-$N=N-$ | $-CH_3$ | H | $-CH_3$ | H | H | H | Do. |
| 44 | quinolyl-$N=N-$ | $-CH_3$ | H | $-CH_3$ | H | H | H | Do. |
| 45 | $CH_3COHN-\bigcirc-N=N-$ | H | H | $-CH_3$ | H | H | H | Do. |
| 46 | $\bigcirc(CH_3)-N=N-$ | Cl | H | $-CH_3$ | H | H | H | Do. |

TABLE—Continued

| Ex. No. | R₁ | R₂ | R₃ | R₄ | R₅ | R₆ | R₇ | Shade on polyester fibre |
|---|---|---|---|---|---|---|---|---|
| 47 | (triazole-N=N-phenyl) | H | H | —CH₃ | H | H | H | Do. |
| 48 | F₃C—C₆H₄—N=N— | —Br | H | —CH₃ | H | H | H | Do. |
| 49 | H | H | H | H | H | H | H | Yellow. |
| 50 | Cl | H | H | H | H | H | H | Do. |
| 51 | Br | H | H | H | —N=N—C₆H₅ | H | H | Do. |
| 52 | —CH₃ | H | H | H | —N=N—C₆H₅ | H | H | Reddish yellow. |
| 53 | —OCH₃ | H | H | H | —N=N—C₆H₅ | H | H | Do. |
| 54 | —OCH₂CH₃ | H | H | H | —N=N—C₆H₅ | H | H | Yellow. |
| 55 | H | H | H | H | —N=N—C₆H₅ | H | H | Do. |
| 56 | H | H | —Cl | H | —N=N—C₆H₅ | H | H | Do. |
| 57 | HO—C₆H₄—N=N— | H | H | H | H | H | H | Reddish yellow. |
| 58 | HO—C₆H₄(CH₃)—N=N— | H | H | —CH₃ | H | H | H | Do. |
| 59 | (pyrazolyl)—N=N— | H | H | —OCH₃ | H | H | H | Do. |
| 60 | (pyrazolyl-OH)—N=N— | H | H | —OCH₃ | H | H | H | Do. |
| 61 | CH₃O—C(=O)—CH₂CH₂—NH—C₆H₃(CH₃)—N=N— | H | H | CH₃ | H | H | H | Orange. |

3,741,954

TABLE—Continued

| Ex. No. | R₁ | R₂ | R₃ | R₄ | R₅ | R₆ | R₇ | Shade on polyester fibre |
|---|---|---|---|---|---|---|---|---|
| 62 | HO—⟨⟩—N=N—⟨⟩—CH₃ | H | H | —OCH₃ | H | H | H | Reddish yellow. |
| 63 | H₃C₆—N=N— | H | H | H | —N=N—C₆H₅ | H | H | Do. |
| 64 | H₅C₆—N=N— | H | H | —OCH₃ | H | H | H | Do. |
| 65 | H₅C₆—N=N— | H | H | H | H | H | —OCH₃ | Do. |
| 66 | COCH₃ / CH—N=N— / CONH—C₆H₅ | H | H | —Br | H | H | H | Yellow. |
| 67 | H₅C₆—N=N— | H | H | —NO₂ | H | H | H | Reddish yellow. |
| 68 | H₅C₆—N=N— | H | H | H | —NO₂ | H | —NO₂ | Do. |
| 69 | H₅C₆—N=N— | H | H | H | H | H | H | Do. |
| 70 | Cl—⟨⟩—N=N— | H | H | —C₂H₅ | H | H | H | Do. |
| 71 | H | —CH₃ | H | H | —N=N—⟨⟩—NO₂ | H | H | Orange. |
| 72 | CH₃COOCH₂CH₂—N(CH₂CN)(CH₂—)—⟨⟩—N=N— | H | H | H | H | H | H |  |
| 73 | H | H | H | H | —N=N—⟨⟩(OH)—⟨⟩(CH₃) | H | H | Yellow. |
| 74 | H | H | H | H | —N=N—⟨⟩(OH)(CH₃) | H | H | Do. |

TABLE—Continued

| Ex. No. | R₁ | R₂ | R₃ | R₄ | R₅ | R₆ | R₇ | Shade on polyester fibre |
|---|---|---|---|---|---|---|---|---|
| 75 | H | H | H | H | H | —N=N—[pyrazole with CH₃, NH₂, C₆H₅] | H | Do. |
| 76 | [4-hydroxy-3-methylphenyl]—N=N— | H | H | H | H | H | H | Do. |
| 77 | [3-hydroxycarbazol-2-yl]—N=N— | H | —CH₃ | H | H | H | H | Brown. |
| 78 | [2-hydroxydibenzofuran-3-yl]—N=N— | H | —CH₃ | H | H | H | H | Yellow. |
| 79 | [3-hydroxy-N-methylcarbostyril]—N=N— | Cl | H | —CH₃ | H | H | H | Do. |
| 80 | [1,3-dioxane-CH-]—N=N— | H | H | —CH₃ | H | H | H | Do. |
| 81 | CH₃CH₂O—C₆H₄—N=N— | H | H | —CH₃ | H | H | H | Do. |
| 82 | H₃CO—C₆H₄—N=N— | H | H | —CH₃ | H | H | H | Reddish yellow. |
| 83 | OHC—C₆H₄—N=N— | H | H | —CH₃ | H | H | H | Do. |

TABLE—Continued

| Ex. No. | R₁ | R₂ | R₄ | R₅ | R₆ | R₇ | Shade on polyester fibre |
|---|---|---|---|---|---|---|---|
| 84 | H₅C₆-C(=O)- | H | -CH₃ | H | H | H | Do. |
| 85 | CH₃CH₂O₂S- | H | -CH₃ | H | H | H | Do. |
| 86 | H | H | H | -N=N-C₆H₄-SO₂CH₂CH₂OH | H | H | Yellow. |
| 87 | H₅C₆-CH₂-O₂S- | H | -CH₃ | H | H | H | Reddish yellow. |
| 88 | HOCH₂CH₂HNO₂S- | H | -CH₃ | H | H | H | Do. |
| 89 | (HOCH₂CH₂)₂N-O₂S- | H | -CH₃ | H | H | H | Do. |
| 90 | (CH₃)₂N- | H | -CH₃ | H | H | H | Orange. |
| 91 | (CH₃CH₂)₂N- | Cl | -CH₃ | H | H | H | Do. |
| 92 | N≡C-CH₂CH₂HN- | H | -CH₃ | H | H | H | Do. |
| 93 | H | H | H | -N=N-C₆H₄-NHCHO | H | H | Yellow. |
| 94 | CH₃COHN- | H | -CH₃ | H | H | H | Reddish yellow. |
| 95 | CH₃CH₂COHN- | H | -CH₃ | H | H | H | Do. |
| 96 | ClCH₂CH₂HN- | H | -CH₃ | H | H | H | Do. |
| 97 | CH₃O₂SHN- | H | -CH₃ | H | H | H | Do |
| 98 | H | H | -CH₃ | -N=N-C₆H₄-COOCH₂CH₃ | H | H | Yellow. |
| 99 | CH₃CH₂O-C(=O)- | H | -CH₃ | H | H | H | Reddish yellow. |

TABLE—Continued

| Ex. No. | R₁ | R₂ | R₃ | R₄ | R₅ | R₆ | R₇ | Shade on polyester fibre |
|---|---|---|---|---|---|---|---|---|
| 100 | H | H | H | —CH₃ | —N=N—C₆H₄—C(=O)—O—CH₂—C₆H₅ | H | H | Yellow. |
| 101 | H | H | H | —CH₃ | —N=N—C₆H₄—NH—C(=O)—O—CH₃ | H | H | Do. |
| 102 | H | H | H | —CH₃ | —N=N—C₆H₄—NH—C(=O)—O—CH₂CH₃ | H | H | Do. |
| 103 | H₂N—C(=O)—C₆H₄—N=N— | H | H | —CH₃ | H | H | H | Reddish yellow. |
| 104 | CH₃HN—C(=O)—C₆H₄—N=N— | H | H | —CH₃ | H | H | H | Do. |
| 105 | H | H | H | —CH₃ | —N=N—C₆H₄—CONHCH₂CH₃ | H | H | Yellow. |
| 106 | H | H | H | H | —N=N—C₆H₄—CON(C₂H₅)₂ | H | H | Do. |
| 107 | H₅C₆—NH—C(=O)—C₆H₄—N=N— | H | H | —CH₃ | H | H | H | Reddish yellow. |
| 108 | (pyrazole: CH₃, N—CH(CH₃)₂, NH₂)—N=N— | H | H | —CH₃ | H | H | H | Yellow |
| 109 | (isoxazole: CH₃, OH)—N=N— | H | H | —CH₃ | H | H | H | Do. |
| 110 | (pyrazole: COHN₂, H₅C₆—N, OH)—N=N— | H | H | —CH₃ | H | H | H | Do. |
| 111 | (thienyl)—N=N— | H | H | —CH₃ | H | H | H | Do. |

TABLE—Continued

| Ex. No. | R₁ | R₂ | R₃ | R₄ | R₅ | R₆ | R₇ | Shade on polyester fibre |
|---|---|---|---|---|---|---|---|---|
| 112 | HO-[quinoline]-N=N- | H | H | —CH₃ | H | H | H | Reddish yellow. |
| 113 | H₅C₆—N=N— | —OCH₃ | H | —CH₃ | H | H | H | Do. |
| 114 | H₅C₆—N=N— | —H | —OCH₃ | —CH₃ | H | H | H | Do. |
| 115 | H₅C₆—N=N— | —CH₃ | —OCH₃ | —CH₃ | H | H | H | Do. |
| 116 | H₅C₆—N=N— | —NHCOCH₃ | —C₂H₅ | —CH₃ | H | H | H | Do. |
| 117 | H₅C₆—N=N— | H | H | —CH₃ | H | H | H | Do. |
| 118 | [naphthyl]-N=N- | H | H | | H | | | Do. |
| 119 | H₅C₆—N=N— | Br | H | —CH₃ | H | H | H | Do. |
| 120 | H—C(=O)—HN— | H | H | —CH₃ | —N=N—C₆H₅ | H | H | Yellow. |
| 121 | CH₃CH₂COHN— | H | H | —CH₃ | —N=N—C₆H₅ | H | H | Do. |
| 122 | H₅C₆—COHN— | —NHCOOCH₃ | H | —CH₃ | —N=N—C₆H₅ | H | H | Do. |
| 123 | H₅C₆—N=N— | H | H | —CH₃ | H | H | H | Reddish yellow. |
| 124 | CH₃OH₂C·OC·OHN— | H | H | —CH₃ | —N=N—C₆H₅ | H | H | Yellow. |
| 125 | H₅C₆—CH₂OCOHN— | H | H | —CH₃ | —N=N—C₆H₅ | H | H | Do. |
| 126 | Br-[benzothiazole]-N=N- | H | H | —CH₃ | H | H | H | Reddish yellow. |
| 127 | Br-[benzothiazole]-N=N- | H | H | —CH₃ | H | H | H | Do. |
| 128 | [benzothiazole]-N=N- | H | H | —CH₃ | H | H | H | Do. |
| 129 | O₂N-[benzothiazole]-N=N- | H | H | —CH₃ | H | H | H | Do. |
| 130 | N≡C-[benzothiazole]-N=N- | H | H | —CH₃ | H | H | H | Do. |
| | CH₃O-[benzothiazole]-N=N- | | | | | | | |

TABLE—Continued

| Ex. No. | R₁ | R₂ | R₃ | R₄ | R₅ | R₆ | R₇ | Shade on polyester fibre |
|---|---|---|---|---|---|---|---|---|
| 131 | F₃C–[benzothiazol-2-yl]–N=N– | H | H | –CH₃ | H | H | H | Do. |
| 132 | CH₃O₂S–[benzothiazol-2-yl]–N=N– | H | H | –CH₃ | H | H | H | Do. |
| 133 | H₂NO₂S–[benzothiazol-2-yl]–N=N– | H | H | –CH₃ | H | H | H | Do. |
| 134 | H | H | H | H | –N=N–[benzothiazol-2-yl]–SO₂NHCH₃ | H | H | Do. |
| 135 | H | H | H | H | –N=N–[benzothiazol-2-yl]–SO₂N(CH₃)₂ | H | H | Do. |
| 136 | H | H | H | H | –N=N–[benzothiazol-2-yl]–SO₂N(C₂H₅)₂ | H | H | Do. |
| 137 | CH₃CH₂HNO₂S–[benzothiazol-2-yl]–N=N– | H | H | –CH₃ | H | H | H | Do. |
| 138 | (HOCH₂CH₂)₂NO₂S–[benzothiazol-2-yl]–N=N– | H | H | –CH₃ | H | H | H | Do. |
| 139 | CH₃OCH₂CH₂CH₂HNO₂S–[benzothiazol-2-yl]–N=N– | H | H | –CH₃ | H | H | H | Do. |
| 140 | H₃C–[pyrazol-4-yl(NH₂)]–N=N– | H | H | –CH₃ | H | H | H | Yellow. |

TABLE—Continued

| Ex. No. | R₁ | R₂ | R₃ | R₄ | R₅ | R₆ | R₇ | Shade on polyester fibre |
|---|---|---|---|---|---|---|---|---|
| 141 | H₅C₆—CH₂—N=N—  (with NH₂) | H | H | —CH₃ | H | H | H | Do. |
| 142 | Cl—CH₂CH₂CONH—C₆H₄—N=N— | H | H | —CH₃ | H | H | H | Do. |
| 143 | H₅C₆—N=N— | H | H | H | H | H | —C₆H₅ | Reddish yellow. |
| 144 | H₅C₆—N=N— | H | H | C₂H₅ | —OC₂H₅ | H | H | Do. |
| 145 | H₅C₆—N=N— | H | H | H | —COCH₃ | H | H | Do. |
| 146 | H₅C₆—N=N— | H | H | H | —CO—C₆H₅ | H | H | Do. |
| 147 | H₅C₆—N=N— | H | H | H | —O—CH₂—C₆H₅ | H | H | Do. |
| 148 | H₅C₆—N=N— | H | H | —OCOCH₃ | H | H | H | Do. |
| 149 | H₅C₆—N=N— | H | H | —CH₃ | —CH₃ | H | H | Do. |
| 150 | H₅C₆—N=N— | H | H | —CH₃ | H | H | —CH₃ | Do. |
| 151 | H₅C₆—N=N— | H | H | —CH₃ | H | —CH₃ | —CH₃ | Do. |
| 152 | H₅C₆—N=N— | H | H | H | Cl | H | H | Do. |
| 153 | H₅C₆—N=N— | H | H | —OCH₃ | —CN | H | Cl | Do. |
| 154 | H₅C₆—N=N— | H | H | H | —Br | H | H | Do. |
| 155 | H₅C₆—N=N— | H | H | H | —C₆H₅ | H | H | Do. |
| 156 | H₅C₆—N=N— | H | H | H | —NHCOOCH₃ | H | H | Do. |
| 157 | H₅C₆—N=N— | H | H | H | —NHSO₂CH₃ | H | H | Do. |
| 158 | H₅C₆—N=N— | H | H | C₂H₅ | H | H | H | Do. |
| 159 | H₅C₆—N=N— | H | H | H | —NHCOCH₂CH₃ | H | H | Do. |
| 160 | H₅C₆—N=N— | H | H | —CH₃ | H | H | H | Do. |
| 161 | H₅C₆—N=N— | H | H | —CH₃ | H | H | H | Do. |
| 162 | (Cl-thiazole)—N=N— | H | H | —CH₃ | H | H | H | Do. |
| 163 | (H₃C-thiazole)—N=N— | H | H | —CH₃ | H | H | H | Orange. |
| 164 | (O₂N-thiazole)—N=N— | H | H | —CH₃ | H | H | H | Reddish yellow. |
| 165 | (Br-thiazole)—N=N— | H | H | —CH₃ | H | H | H | Do. |
| 166 | (CH₃-thiazole)—N=N— | H | H | —CH₃ | H | H | H | Do. |
| 167 | (CH₃O-thiazole)—N=N— | H | H | —CH₃ | H | H | H | Do. |
| 168 | (CF₃-thiazole)—N=N— | H | H | —CH₃ | H | H | H | Orange. |
| | H | H | H | —CH₃ | —N=N—(NO₂-thiazole) | | | |

Representative dyestuffs of the foregoing examples are of the formulae

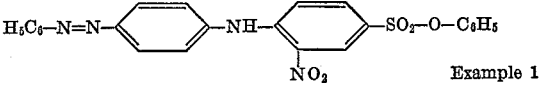

Example 1

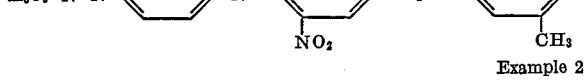

Example 2

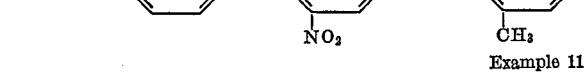

Example 11

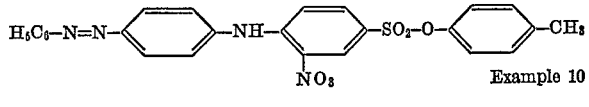

Example 10

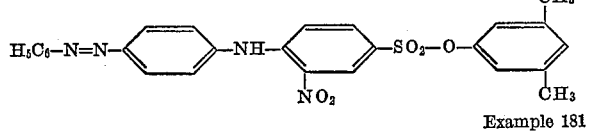

Example 181

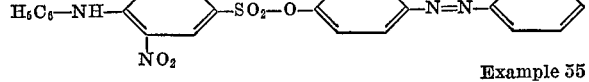

Example 55

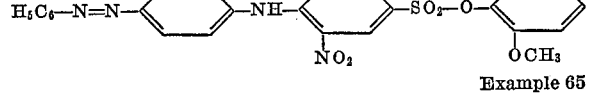

Example 65 and

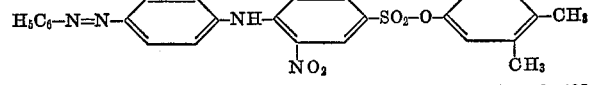

Example 182

Having thus disclosed the invention what I claim is:

1. A compound of the formula

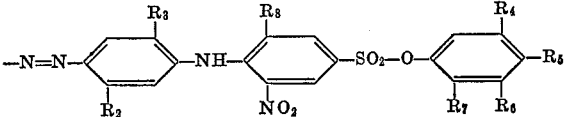

or

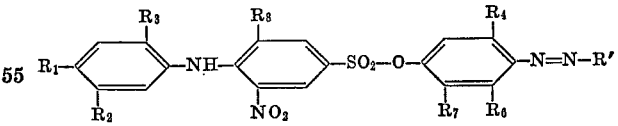

wherein
  $R_1$ is hydrogen, chloro, bromo, alkyl, alkoxy formamido, alkylcarbonylamino, chloroalkylcarbonylamino, bromoalkylcarbonylamino, benzamido, alkoxycarbonylamino or benzyloxycarbonylamino,
  $R_2$ is hydrogen, chloro, bromo, alkyl, alkoxy, alkylcarbonylamino or alkoxycarbonylamino,
  $R_3$ is hydrogen, chloro, bromo, alkyl or alkoxy,
  $R_4$ is hydrogen, chloro, bromo, alkyl, alkoxy, cyano, nitro, alkylcarbonyloxy, methylsulfonyl or carbamoyl,
  $R_5$ is hydrogen, chloro, bromo, nitro, cyano, thiocyano, alkyl, phenyl, alkoxy, benzyloxy, alkylcarbonyl, benzoyl, alkoxycarbonyl, alkylcarbonylamino, alkoxycarbonylamino, benzamido, alkylsulfonyl, phenylsulfonyl, benzylsulfonyl, or alkylsulfonylamino,
  $R_6$ is hydrogen or alkyl,
  $R_7$ is hydogen, chloro, bromo, alkyl, alkoxy, phenyl, nitro or alkylcarbonylamino, R₈ is hydrogen or nitro,
R is phenyl or substituted phenyl, wherein each substituent of substituted phenyl is independently chloro, bromo, cyano, thiocyano, nitro, hydroxy, alkyl, trifluoromethyl, alkoxy, phenoxy, alkylamino, dialkylamino, chloroalkylamino, di(chloroalkyl)amino, bromoalkylamino, di(bromoalkyl)amino, cyanoalkylamino, di(cyanoalkyl)amino, alkylcarbonyloxyalkylamino, di(alkylcarbonyloxyalkyl)amino, N-cyanoethyl - N - acetoxyethylamino, alkoxycarbonylalkylamino, di(alkoxycarbonylalkyl)amino, formyl, alkylcarbonyl, benzoyl, alkoxycarbonyl, alkylcarbonyloxy, carbamoyl, alkylcarbamoyl, dialkylcarbamoyl, phenylcarbamoyl, formamido, alkylcarbonylamino, chloropropionamido, benzamido, alkylsulfonyl, phenylsulfonyl, benzylsulfonyl, sulfamoyl, alkylsulfamoyl, dialkylsulfamoyl, hydroxyalkylsulfamoyl, di(hydroxyakyl)sulfamoyl, cyanoalkylsulfamoyl, di(cyanoalkyl)sulfamoyl, phenylsulfamoyl or alkylsulfonylamino, and
R' is phenyl or substituted phenyl, wherein each substituent of substituted phenyl is independently chloro, bromo, hydroxy, nitro, alkyl, alkylsulfonyl, hydroxyalkylsulfonyl, formamido, alkoxycarbonyl, benzyloxycarbonyl, alkoxycarbonylamino, alkylcarbamoyl or dialkylcarbamoyl,
wherein each alkyl, alkoxy, alkylsulfonyl, alkylsulfonylamino, alkylamino, chloroalkylamino, bromoalkylamino, alkylsulfamoyl, hydroxyalkylsulfamoyl, and hydroxyalkylsulfonyl, the alkyl chain of each alkylcarbonylamino, chloroalkylcarbonylamino, bromoalkylcarbonylamino, alkylcarbonyloxy, alkylcarbonyl, cyanoalkylamino, alkoxycarbonylalkylamino, alkylcarbamoyl and cyanoalkylsulfamoyl, each alkyl chain of each dialkylamino, di(chloroalkyl)amino, di(bromoalkyl)amino, di(cyanoalkyl)amino, alkylcarbonyloxyalkylamino, di(alkylcarbonyloxyalkyl)amino, di(alkoxycarbonylalkylamino, dialkylcarbamoyl, dialkylsulfamoyl, di(hydroxyalkyl)sulfamoyl and di-(cyanoalkyl)sulfamoyl, the alkoxy chain of each alkoxycarbonylamino, alkoxycarbonyl and alkoxycarbonylalkylamino, and each alkoxy chain of each di(alkoxycarbonylalkyl)amino independently has 1 to 4 carbon atoms.

2. A compound according to claim 1 wherein each alkyl, alkoxy, alkylsulfonyl, alkylsulfonylamino, alkylamino, chloroalkylamino, bromoalkylamino, alkylsulfamoyl, hydroxyalkylsulfamoyl and hydroxyalkylsulfonyl, the alkyl chain of each alkylcarbonylamino, chloroalkylcarbonylamino, bromoalkylcarbonylamino, alkylcarbonyloxy, alkylcarbonyl, cyanoalkylamino, alkoxycarbonylalkylamino, alkylcarbamoyl and cyanoalkylsulfamoyl each alkyl chain of each dialkylamino, di(chloroalkyl)amino, di(bromoalkyl)amino, di(cyanoalkyl)amino, alkylcarbonyloxyalkylamino, di(alkylcarbonyloxyalkyl)amino, di-(alkoxycarbonylalkyl)amino, dialkylcarbamoyl, dialkylsulfamoyl, di(hydroxyalkyl)sulfamoyl and di(cyanoalkyl)sulfamoyl, the alkoxy chain of each alkoxycarbonylamino, alkoxycarbonyl and alkoxycarbonylalkylamino, and each alkoxy chain of each di(alkoxycarbonylalkyl) amino independently has 1 or 2 carbon atoms.

3. A compound according to claim 2 wherein
R₁ is hydrogen, bromo, alkyl, alkoxy, formamido, alkylcarbonylamino, benzamido, alkoxycarbonylamino or benzyloxycarbonylamino,
R₃ is hydrogen, chloro, alkyl or alkoxy,
R₄ is hydrogen, alkyl, alkoxy, cyano, nitro, alkylcarbonyloxy, methylsulfonyl or carbamoyl,
R₅ is hydrogen, chloro, bromo, nitro, cyano, thiocyano, alkyl, phenyl, alkoxy, benzyloxy, alkylcarbonyl, benzoyl, alkoxycarbonyl, alkylcarbonylamino, alkoxycarbonylamino benzamido, phenylsulfonyl, benzylsulfonyl or alkylsulfonylamino,
R₇ is hydrogen, chloro, alkyl, alkoxy, phenyl, nitro or alkylcarbonylamino,
R is phenyl or substituted phenyl, wherein each substituent of substituted phenyl is independently chloro, bromo, cyano, thiocyano, nitro, hydroxy, alkyl, trifluoromethyl, alkoxy, phenoxy, dialkylamino, chloroalkylamino, cyanoalkylamino, alkoxycarbonylalkylamino, N-cyanoethyl-N-acetoxyethylamino, formyl, alkylcarbonyl, benzoyl, alkoxycarbonyl, alkylcarbonyloxy, carbamoyl, alkylcarbamoyl, dialkylcarbamoyl, phenylcarbamoyl, alkylcarbonylamino chloropropionamido, alkylsulfonyl, benzylsulfonyl, sulfamoyl, alkylsulfamoyl, dialkylsulfamoyl, hydroxyalkylsulfamoyl, di(hydroxyalkyl)sulfamoyl, cyanoalkylsulfamoyl, di(cyanoalkyl)sulfamoyl, phenylsulfamoyl or alkylsulfonylamino, and
R' is phenyl or substituted phenyl, wherein each substituent of substituted phenyl is independently chloro, hydroxy, nitro, alkyl, hydroxyalkylsulfonyl, formamido, alkoxycarbonyl, benzyloxycarbonyl, alkoxycarbonylamino, alkylcarbamoyl or dialkylcarbamoyl.

4. A compound according to claim 3 having the formula

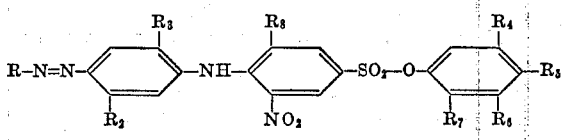

wherein
R₃ is hydrogen, alkyl or alkoxy, and
R is phenyl or substituted phenyl having one or two substituents.

5. A compound according to claim 4 wherein
R₂ is hydrogen,
R₃ is hydrogen,
R₄ is hydrogen or methyl,
R₅ is hydrogen or methyl,
R₆ is hydrogen or methyl,
R₇ is hydrogen, methyl or methoxy,
R₈ is hydrogen, and
R is phenyl,
with the proviso that at least two of R₄, R₅, R₆ and R₇ are hydrogen.

6. A compound according to claim 3 having the formula

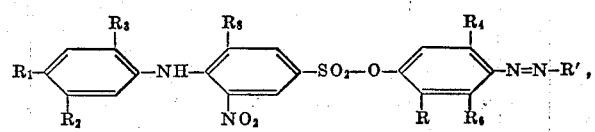

wherein
R₂ is hydrogen or alkyl,
R₃ is hydrogen or chloro,
R₄ is hydrogen or alkyl,
R₆ is hydrogen,
R₇ is hydrogen,
R₈ is hydrogen, and
R' is phenyl or substituted phenyl having one or two substituents.

7. A compound according to claim 6 wherein
R₁ is hydrogen, methyl, methoxy or ethoxy,
R₂ is hydrogen or methyl,
R₄ is hydrogen or methyl, and
R' is phenyl or monosubstituted phenyl.

8. A compound according to claim 5 having the formula

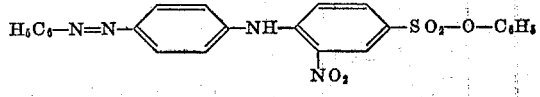

9. A compound according to claim 5 having the formula

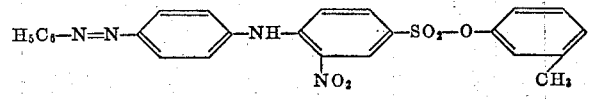

10. A compound according to claim 5 having the formula

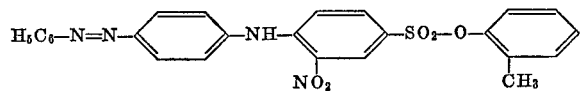

11. A compound according to claim 5 having the formula

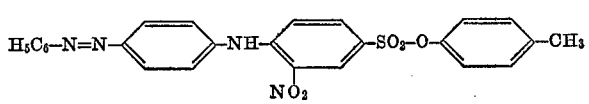

12. A compound according to claim 5 having the formula

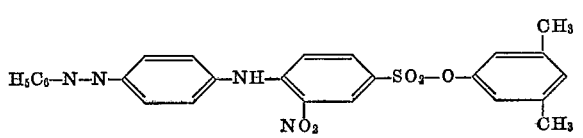

13. A compound according to claim 7 having the formula

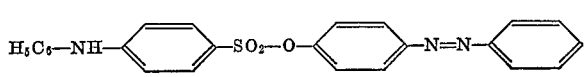

14. A compound according to claim 5 having the formula

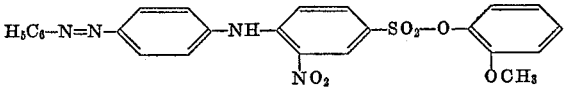

15. A compound according to claim 5 having the formula

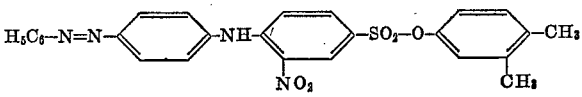

References Cited
UNITED STATES PATENTS

| | | | |
|---|---|---|---|
| 3,516,982 | 6/1970 | Dimroth et al. | 260—206 |
| 3,535,306 | 10/1970 | Altermatt et al. | 260—207.1 |
| 1,734,246 | 11/1929 | Eichwede | 260—207.1 X |
| 3,663,531 | 5/1972 | Liechti | 206—206 |

LEWIS GOTTS, Primary Examiner

C. F. WARREN, Assistant Examiner

U.S. Cl. X.R.

260—152, 153, 154, 155, 156, 157, 158, 159, 162, 164, 169, 173, 174, 176, 177, 178, 184, 186, 187, 190, 191, 192, 193, 196, 206, 207, 207.1; 8—41 C